Dec. 14, 1954   H. G. GROEHN ET AL   2,696,857
PORTABLE ELECTRIC CONTOUR SHAPING MACHINE
Filed March 28, 1951   3 Sheets-Sheet 1

INVENTOR.
HARVEY G. GROEHN
OSCAR M. GUENSCHE
BY
*A. L. Wilson*
ATTORNEY.

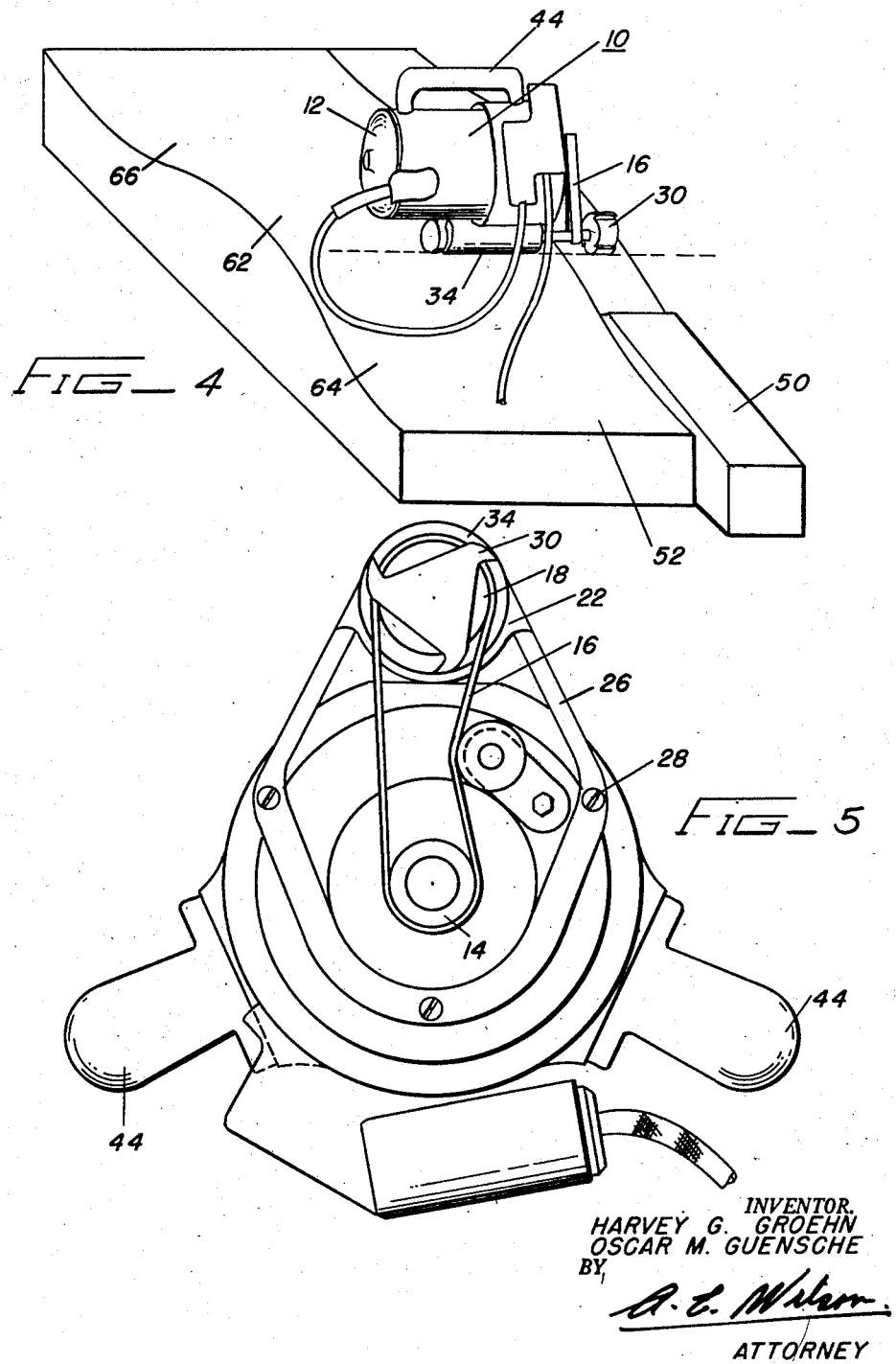

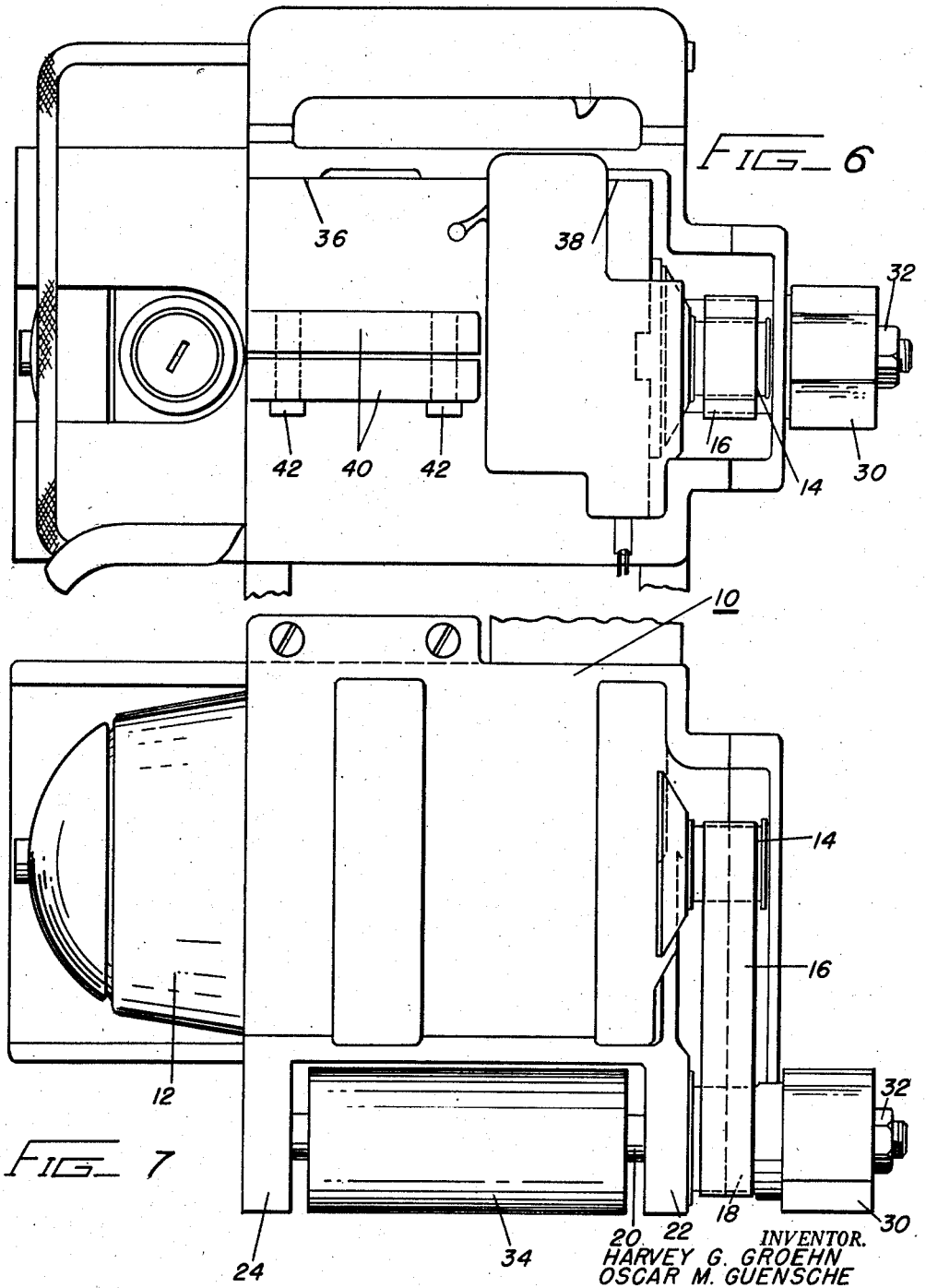

United States Patent Office 2,696,857
Patented Dec. 14, 1954

2,696,857

PORTABLE ELECTRIC CONTOUR SHAPING MACHINE

Harvey G. Groehn, Detroit, and Oscar G. M. Guensche, Grosse Pointe, Mich.

Application March 28, 1951, Serial No. 218,034

6 Claims. (Cl. 144—144)

This invention relates to contour shaping equipment and more particularly to an electric portable tool for shaping any flat or contoured surface from a pre-established surface or template.

Heretofore, for example in the making of die checking, die spotting, models, patterns, molds, and other types of fixtures, it has been customary to shape a curve on portions of the fixture by the use of a stationary shaping machine, the job being moved about a stationary fixed rotary cutter. This cutter was guided by a collar fixed concentrically about the same shaft as the cutter of the shaping machine thereby following a template moved along the tangent point of a guiding collar which resulted in the knives of the rotary head removing excess material of the piece of work to be shaped exactly coinciding with the pre-established shape of the template.

Usually these stationary shaping machines while following the contour of the template with an in and out movement do not move vertically up and down while the template and the work is being moved either to the right or to the left. This method of forming contours and shapes is time-consuming due to the necessity of setting up and locating the work-piece and the template to coincide with the conditions of the shaping machine. This method of forming contours and shapes is not suitable for the shaping of very large work where the work piece is beyond the capacity of the machine in relation to the portion of the job requiring shaping to a pre-established template or shape.

This method is also unsuitable in many instances such as where protuberances, projections, and other portions of a work piece are situated and located in such a manner that the machine cannot be applied to the work conditions required on the shaping or finishing of the work piece.

Portable shaping and routing machines while being provided with guiding means to permit following a contour or template in one direction are not adapted to, and do not have means whereby they may be moved vertically upwardly and downwardly while traversing right to left and vice versa, and at the same time following a pre-established contour. Also heretofore in the formation of die checking and other types of fixtures and contour shaping work, it has been necessary to work off by hand a contour flush with another pre-established contour or template because of the inadequacies of previous stationary shaping machines and previous portable shaping and routing machines.

My invention overcomes many of the disadvantages of the heretofore manufactured stationary and portable shaping and routing machines. It is applicable to any size work, and is only limited as to location by the availability of electric power. My machine will shape and cut a contour either inside or outside, concave or convex, and at the same time will cut upward or downward while being moved to the right or left under the guidance of manual operation.

This is accomplished by the use of a high speed electrical motor and motor-frame having a driving means on one or both ends to drive a spindle shaft so positioned paralled to the electrical motor shaft that the spindle will rotate in a plane parallel to the motor shaft and at the side of the motor housing. The spindle is provided with holding and driving means on either end to retain cutters, burrs, rotary files etc. of suitable characteristics such that they rotate with their cutting edges flush, projecting or set-back from a guiding collar or roller arrangement concentric with the spindle shaft and parallel with the motor shaft.

By the use of conveniently located handles suitable force can be exerted on a line of tangency to the outside of the rotary spindle against a pre-established template or contoured shape which can be followed manually and excess material on the work removed bu the cutter so that the portion being cut will coincide exactly to the shape of the template or contour existing at the point or line of tangency being followed by the concentric guiding means about the spindle shaft. Upon the making of the first cut should the axial length of the cutter not be sufficient to fully perform the desired operation, the machine may simply be moved upward or downward and a second cut may be made exactly coinciding to the surface of the first cut. This can be continued on indefinitely to form an extended flush or contoured shape.

An object of this invention is therefore to provide a portable electric combination shaping and routing machine which may be economically produced and which will cut contours in two directions at the same time flush or off set in relation to a pre-established template or contoured surface.

Another object of the invention resides in the provision of a shaping and routing machine, having separate and interchangeable electric motor driving mechanism adapted to be interchangeably positioned concentrically in a supporting frame having suitable guiding means and cutting attachments that can readily be interchanged at will and with ease.

A further object of this invention is to provide an electric motor driving means, a frame quickly demountable from the electric motor driving means and a frame having guiding means and interchangeable cutters, burrs, rotary files etc. and other tools of different types, lengths and diameters to adapt the machine for a wide range of work.

A still further object of the invention resides in the provision of a portable electric shaping machine that can be used to follow any pre-established contour in any position or location on a piece of work without being restricted as to directions of travel and cut other than obstacles limiting the movement of the guiding means or space requirements for the shaping machine itself or the guiding and cutting elements thereof.

Other objects, advantages, and uses of this invention in fields of work other than that described will be apparent from the following detailed description considered in connection with the accompanying drawings, submitted for purposes of illustration only, and not intended to define the scope of the invention, reference being had for that purpose to the subjoined claims.

In the accompanying drawings wherein similar reference characters refer to similar parts throughout the several views:

Fig. 4 is another perspective view illustrating the use of our improved contour shaping machine.

Fig. 5 is an end elevation view of the machine.

Fig. 6 is a top plan view of our improved device.

Fig. 7 is a side elevation sectional view thereof.

Figure 1:
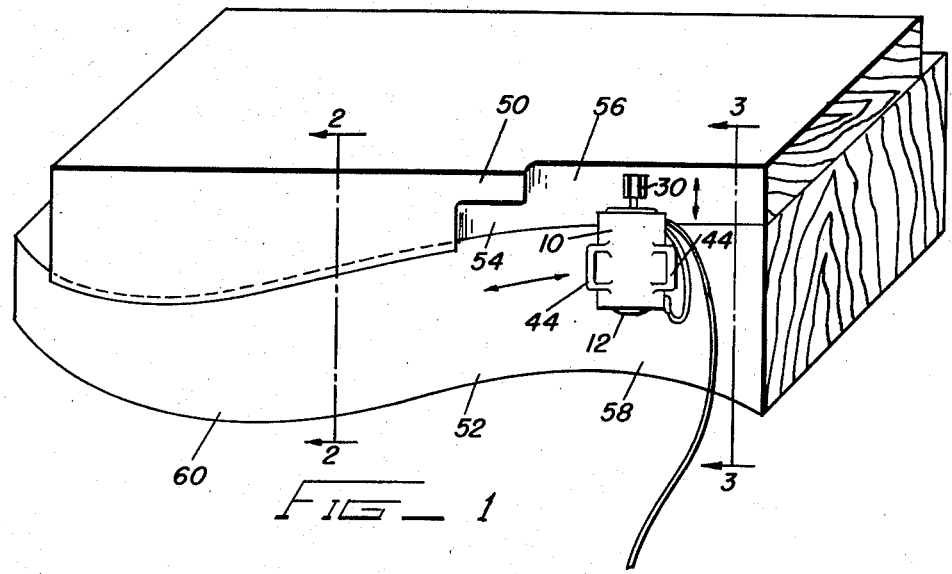
Fig. 1 is a perspective view illustrating the use of our improved machine in the shaping of compound curvatures on a piece of work.

Before explaining in detail the present invention, it is to be understood that the invention is not limited in its application to the details of construction and arrangement of parts illustrated in the accompanying drawings, since the invention is capable of other embodiments and of other construction and arrangement of parts so that the desired result of following contours with a portable electric shaping machine can be practiced and carried out in various ways. Also it is to be understood that the phraseology or terminology employed herein is for the purpose of description and not of limitation.

It is also to be understood that many various attachments, accessories, auxiliary guiding means, bases, mechanical driving means, and so forth can be altered, changed, added to, deleted and so forth, to make the invention more suitable to many additional job and working condition requirements, and still retain the basic offset, interchangeable, parallel, concentric, guiding and cutting means to follow a curve, sweep, shape, and so forth.

Referring now more particularly to the drawings it will be observed that our improved contour shaping machine has a main frame 10 adapted to receive an electric motor 12. The motor 12 is provided with a pulley 14 to drive, through a belt 16, a spindle pulley 18 fixed to a shaft 20 journalled in bosses 22 and 24 of frames 26 secured to the frame 10 in any desired manner as by fasteners 28. The end of the shaft 20 is suitably contoured to selectively receive and drive one of a plurality of cutting wheels 30 of different shapes and diameters adapted to be releasably secured thereto as by a nut 32.

An elongated guide roller 34 is concentrically mounted relative to the shaft 20, and has a diameter slightly greater than that of the bosses 22 and 24 as best illustrated in Fig. 7. It will of course be apparent that if desired one of a plurality of guide rollers 34 of different diameters may be employed in conjunction with suitably proportioned frames 26, and that if desired the guide roller may be contoured either concave or convex to adapt our improved machine to particular jobs.

The main frame 10 is preferably formed of relatively light weight material such for example as aluminum or magnesium to minimize weight. The motor 12 is also of relatively light weight construction and has sufficient power to drive the cutting wheel 30 at sufficiently high speed to insure a clean smooth cut. The motor 12 may be of any desired shape, and the main frame 10 preferably has interior machined surfaces 36 and 38 as illustrated in Fig. 6 to slide over the exterior surface of the motor 12. Suitable clamping flanges 40 also illustrated in Fig. 6 are adapted to be urged toward each other by studs 42 to securely clamp the motor 12 within the main frame 10. A suitable cover may be employed to enclose the cutter driving mechanism to protect the operator.

Any convenient means may be employed to manipulate our improved machine such for example as a pair of handles 44 preferably spaced angularly equidistant from the guide roller 34 and cutter 30.

Figure 2:
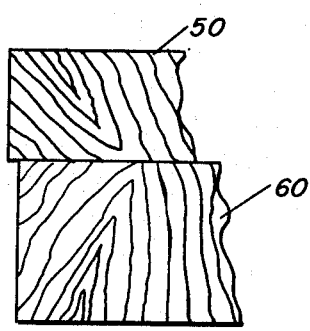
Fig. 2 is a sectional view taken substantially on the line 2—2 of Fig. 1, looking in the direction of the arrows.
Figure 3:
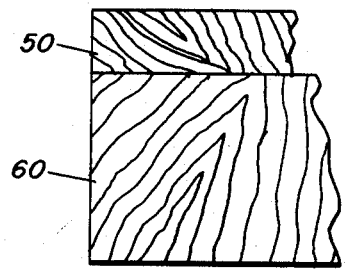
Fig. 3 is a sectional view taken substantially on the line 3—3 of Fig. 1, looking in the direction of the arrows.

The operation is as follows. Our improved contour shaping device is illustrated in Figs. 1 to 3 as applied to the operation of shaping a compound concave-convex curvature on a member 50 to conform with the contour of a master shape 52 which may be a member separate from the member 50 or may be an integral part thereof having the desired contour.

To impart the desired contour to the member 50 the guide roller 34 of our improved contour shaping device is placed on the surface of the master shape 52 with its longitudinal axis parallel with longitudinal axis of the surface of the master shape 52. The motor 12 is then started by the operation of any suitable switch, either of the snap type or of the push type whereby the current to the motor is interrupted when the actuating portion of the switch is released.

The cutter 30 is positioned on the member 50 whereupon the material of the member 50 is cut away to such an extent that the guide roller 34 can contact the master shape 52 over the entire axial length of the roller 34. The device is then moved by exerting force on the handles 44 to move the cutter 30 over the entire area of the member 50, care being taken to maintain the longitudinal axis of the guide roller 34 and the cutter 30 parallel to the longitudinal axis of the master shape 52.

It will be noted that where the surface of the member 50 to be contoured is wider than the width of the cutter 30 it is necessary to perform the contouring operation in a plurality of steps. For example a cut 54 equal in width to substantially the length of the cutter 30 is taken adjacent to the surface of the master shape 52 as illustrated in Fig. 1. If desired this cut may be extended the full length of the master shape 52, or it may only extend a portion of the length as illustrated. When one cut 54 has been made, another cut 56 also equal in width to substantially the length of the cutter 30 may be made, it being understood that where the cutting edge of the cutter 30 aligns with the guide roller 34, the guide roller 34 may be rolled over the surface of the master shape 52 and the surfaces 54, 56 of the member 50 aligned with the surface of the master shape 52 to form on the member 50 the desired contour.

It will of course be apparent that in certain types of work it is desirable that the roller 34 be accurately maintained in alignment with the longitudinal axis of the contoured sections of the master shape 52. An example is the contouring of the concave and convex sections 58 and 60 illustrated in Fig. 1. This may of course be accomplished by sliding the guide roller 34 axially on the master shape 52 parallel with the longitudinal axis of the concave and convex sections 58 and 60.

Attention is also directed to the fact that if portions of the longitudinal axes of the master shape 52 are of conical shape, the desired contour may be imparted to the member 50 by maintaining the longitudinal axis of the guide roller 34 aligned with the longitudinal axis of the portions of the master shape 52 which are of conical shape.

Referring to Fig. 4 it will be noted that our improved contouring device is applied to the contouring on a member 50 of a curvature from a master shape 52 having a single convex 62 and double concave curvature 64 and 66. The cutter 30 is applied to the stock of the member 50 to be removed as described in connection with the embodiment of Figs. 1 to 3, that is by applying the guide roller 34 to the master shape and moving the contouring device to apply the cutter to the stock to be removed. It will of course be apparent that the guide roller 34 may be shifted axially of its longitudinal axis as described above.

It will be apparent that if it is desired to contour the member 50 differently from the master shape 52 the guide roller 34 and one of a plurality of cutters 30 of suitable size may be employed to contour the surface of the member 50 above or below the contour of the master shape 52 as desired.

We claim:

1. A portable contour shaping machine comprising a frame, a driving motor mounted in the frame and having a longitudinal axis, a spindle rotatably mounted in the frame and being spaced from and having an axis extending parallel to the longitudinal axis of the motor, driving means between the motor and the spindle, an elongated guide roller having its axis in alignment with and spaced axially relative to the spindle, a cutting tool secured to the spindle to be driven thereby to exert a stock removing operation in a plane parallel to the longitudinal axis of the guide roller as the guide roller is moved over the surface of a piece of work, and spaced handles carried by the frame.

2. The invention defined in claim 1 wherein the frame has clamping means whereby it may be clamped to one of a plurality of interchangeable driving motors.

3. A portable contour shaping device comprising a frame, a source of power secured in the frame and having a longitudinal axis, elongated guiding means carried by the frame and including a working surface having a longitudinal axis eccentric to the longitudinal axis of the source of power, a rotatable cutting tool spaced axially from the guiding means and having its axis in alignment with and spaced from the axis of the guiding means, and motion transmitting means between the source of power and the rotatable tool whereby the cutting tool may perform a stock removing operation in a plane parallel to the surface of the guiding means as the guiding means is moved over the surface of a piece of work.

4. The invention defined in claim 3 wherein the frame has a pair of handles spaced equidistant angularly from the longitudinal axis of the guiding means.

5. A portable contour shaping device comprising a frame, an electric motor having a longitudinal axis adapted to be clamped in said frame, axially extending guiding means carried by said frame and having an axis eccentric to the axis of the motor, a rotatable cutter spaced axially with reference to the guiding means and having its axis aligned with the axis of the guiding means, and driving means between said motor and cutter whereby the cutter may perform a stock removing operation in a plane parallel to the surface of the guiding means as the guiding means is moved over the surface of a piece of work.

6. A material contouring device comprising a body portion including a motor having an axis of rotation, elongated guiding means secured to the body portion and including a working surface having a longitudinal axis spaced from and extending parallel with the axis of rotation of the motor, a rotatable cutting tool spaced axially from the guiding means and having its axis in alignment with the axis of the guiding means, and motion transmitting means between the motor and the rotatable cutting tool.

References Cited in the file of this patent

UNITED STATES PATENTS

| Number | Name | Date |
|---|---|---|
| 699,285 | Clover et al. | May 6, 1902 |
| 752,658 | Dart | Feb. 23, 1904 |
| 766,896 | Von Pein | Aug. 9, 1904 |
| 1,271,618 | Reese | July 9, 1918 |
| 1,551,178 | Strand | Aug. 25, 1925 |
| 1,566,407 | Kelbrick | Dec. 22, 1925 |
| 1,839,196 | Cameron | Jan. 5, 1932 |
| 1,899,883 | Sacrey | Feb. 28, 1933 |
| 2,307,464 | Metting | Jan. 5, 1943 |